United States Patent
Higashi et al.

[15] 3,650,828
[45] Mar. 21, 1972

[54] MAGNETIC COATING FORMULATION FOR RECORDING TAPE

[72] Inventors: Louis M. Higashi, Monte Sereno; Herbert R. McEvers, San Jose, both of Calif.

[73] Assignee: Karex, Inc.

[22] Filed: Sept. 4, 1969

[21] Appl. No.: 855,405

[52] U.S. Cl. ............... 117/235, 117/237, 117/238, 252/62.54, 260/75 NH, 260/859 PV
[51] Int. Cl. ............................................. H01f 10/02
[58] Field of Search ............ 117/235, 237; 252/62.54; 260/75 NH, 859 PV

[56] References Cited

UNITED STATES PATENTS

| | | | |
|---|---|---|---|
| 3,149,995 | 9/1964 | Bauer | 117/235 |
| 3,144,352 | 8/1964 | Talley | 117/235 |
| 3,216,846 | 11/1965 | Hendricx et al. | 117/239 |
| 3,150,995 | 9/1964 | Bauer | 117/238 X |
| 3,247,017 | 4/1966 | Eichler et al. | 117/238 X |
| 3,274,111 | 9/1966 | Sada et al. | 117/237 X |
| 3,387,993 | 6/1968 | Flowers | 117/235 |
| 3,470,021 | 9/1969 | Hendricx et al. | 117/239 |
| 3,490,946 | 1/1970 | Wolff | 117/235 |

FOREIGN PATENTS OR APPLICATIONS

| | | | |
|---|---|---|---|
| 1,091,935 | 11/1967 | Great Britain | 260/859 |

*Primary Examiner*—William D. Martin
*Assistant Examiner*—Bernard D. Pianalto
*Attorney*—Philip D. Freedman and George W. F. Simmons

[57] ABSTRACT

A polymeric binder for magnetic coating exhibiting excellent wear and aging characteristics comprised of a mixture of a high molecular weight vinyl chloride-vinyl acetate or a polyvinyl acetal having a glass transition temperature (Tg) in excess of 70° C. and a thermoplastic polyurethane-polyurea, hydroxyl-functional elastomer which is a reaction product of a mixture of a polyesterdiol, a hydrocarbon diol, a diphenyl sulfone diamine and an organic diisocyanate.

4 Claims, No Drawings

MAGNETIC COATING FORMULATION FOR RECORDING TAPE

BACKGROUND OF THE INVENTION

This invention relates to magnetic recording media and more specifically to a composition of matter wherein magnetically attractive particles are dispersed in a binder system formed from a high molecular weight homologue of vinyl chloride-vinyl acetate or acetal copolymer and a compatible thermoplastic polyurethane-polyurea elastomer possessing hydroxyl functionality.

The advent of high speed tape translational devices, computers and video recorders has created an increasing demand for improved wear-resistant coatings and improved aging characteristics upon exposure to heat. Those who are skilled in the art of manufacturing and testing of magnetic recording media in the form of tapes, cards or discs, are aware that magnetic coating formulations containing heat-curable polymeric binders are known to exhibit a high degree of wear resistance, excellent thermal stability, and aging characteristics. However, there are several inherent limitations to the use of a thermosetting magnetic coating formulation such as those containing reactive isocyanates. Among the most notable ones, are: (1) limited pot life since reactive binders in general exhibit increased viscosity with aging even under ambient environmental conditions thus imparting an unfavorable rheological behavior during coating operations; (2) surface treatment or smoothing operations can only be carried out under conditions of partial cure which results in a product which is unstable in physical properties since hardness, elongation, tensile and modulus of elasticity and other properties are apt to change with aging; and (3) coating shrinkage and tape curl upon heat curing are common occurrences.

Conversely, usable thermoplastic binders for magnetic coatings in general are much more vulnerable to heat and aging than the heat-curable systems. Furthermore, there is a greater vulnerability to oxidation and molecular chain scission reactions which, notwithstanding the loss in physical properties such as flexibility of the coating, may also result in chemical attack and embrittlement of the polyester substrate. This is the case when lower molecular weight vinyl homopolymers and copolymers of vinylidene chloride-acrylonitrile, vinyl chloride-vinyl acetate are employed as binders. Consequently, thermal and oxidative stabilizers are frequently added in varied amounts to achieve improved stability. These materials in nature are high boiling, heavy liquids to soft solids having low melting points and result in magnetic coatings which detract from optimum film properties. Therefore, the best film properties are achieved in coatings in which the minimum of additives are incorporated, and this is possible when the higher molecular weight polymer species are employed.

Despite the aforementioned shortcomings of thermoplastic binders there are a number of fundamental reasons for the desirability of incorporating such binders in magnetic recording media. The advantages are as follows:

1. Simplicity of processing thus entailing less expenditure for process equipment.
2. Absence of viscosity buildup problems since pot life is almost unlimited.
3. Curing per se is merely a process of evaporation of solvents thus making possible short oven dwell times and higher product output for a given facility.
4. Less sensitivity to surface chemical behavior of magnetic particles in general.
5. More amenable to tape surface polishing or smoothing processes.
6. Modifications of binder properties can be accomplished with ease.

Thermoplastic polymers, and more particularly, homopolymers of vinyl chloride or copolymers thereof with vinyl acetate or acrylonitrile when employed as the sole component lack the required physical properties such as toughness, flexibility and wear resistance as a binder in magnetic coatings. Hence, such polymers must be reinforced through the incorporation of either internal or external plasticizers, or elastomeric polymers such as polybutadiene, copolymers of acrylonitrile - butadiene - styrene, polyesters and polyurethanes. Among the most popular and widely employed modifiers in thermoplastic magnetic coatings have been the medium molecular weight (20–30,000) commercially available polyurethane elastomers. The presence of these modifiers in magnetic coatings imparts a superior combination of properties such as toughness, hardness, flexibility, abrasion resistance and adhesion to polyester film over binders which have been modified with conventional rubbers or elastomers. The polyurethane elastomers which have been used are formed through interaction of difunctional hydroxyl-terminated polyesters of varying molecular weights which are esterification products of 1,4-butanediol and adipic acid and a polyisocyanate such as diphenylmethane 4,4'-diisocyanate at a mole ratio such that no terminal hydroxyls are present.

Unfortunately, the medium molecular weight thermoplastic polyurethanes which have been employed as modifiers in magnetic coatings are limited in compatibility with higher molecular weight homologues of vinyl chloride-vinyl acetate copolymers resulting in an undesirable two phase system. Furthermore, solubility is limited in the lower cost, low toxicity, and higher volatility solvents such as methyl ethyl ketone and cyclohexanone. Such conventional thermoplastic polyurethanes are most soluble in the more expensive, toxic and slower solvents such as dimethyl formamide, dimethylacetamide, dimethyl propionamide, dimethyl-sulfoxide and tetrohydrofuran. Another drawback was found to be higher solution viscosities which had a limitation upon binder solids in the magnetic dispersions during ball milling.

SUMMARY OF THE INVENTION

In accordance with the present invention it has been discovered that a modified thermoplastic polyvinyl chloride copolymer based binder for magnetically attractive pigments can be formulated which avoids the problems previously encountered in modifying such copolymers. In this invention a high molecular weight vinyl chloride copolymer of vinyl acetate or a polyvinyl acetal is reinforced and modified with a compatible thermoplastic polyurethane-polyurea elastomer.

In the preferred embodiment a vinyl chloride-vinyl acetate copolymer of a molecular weight on the order of 30–40,000 having a glass transition temperature (Tg) of 70° C. or higher is employed. A novel polyurethane-polyurea elastomer of a molecular weight of approximately 20–30,000 which is the reaction product of an organic diisocyanate with a mixture which comprises a hydrocarbondiol, a diamino diphenyl sulfone and a polymeric polyester of 1,4-butanediol and adipic acid is used as a reinforcing modifier. The modifier contains free hydroxyl groups.

These components of the binder are of relatively high molecular weight and yet are compatible and overcome the several shortcomings and disadvantages of the prior art materials discussed above. The new formulation permits a higher solids content for any given viscosity in the solvent selected for the step of coating the recording substrate. The free hydroxyl groups on the modifier contribute to better adhesion and bonding to the typical recording substrate used such as Mylar. At the same time the hydroxyl functionality promotes compatibility with the vinyl copolymer as well as improving solubility of the formulation in the solvent system.

DESCRIPTION OF THE PREFERRED EMBODIMENTS

The major components of the magnetic recording medium of the present invention will now be summarized.

VINYL COPOLYMER

The formulation utilizes a vinyl copolymer preferably having a molecular weight of above 30,000 and a glass transition temperature (Tg) of above 70° C. A copolymer of vinyl chloride and vinyl acetate or a polyvinyl acetal may be used in the present invention. The preferred material is a vinyl chloride-vinyl acetate copolymer consisting of 90–97 parts of vinyl chloride to 3–10 parts of vinyl acetate. Alternatively, a polyvinyl acetal such as a polyvinyl formal or a polyvinyl butyral may be used instead of polyvinyl acetate. These materials are commercially available under the trademark "Formvar" and "Butvar." In the case of the acetals compatibility with the polyurethane-polyurea modifier is obtained best where a relatively high acetate content and low formal content is present in the polymer. For example, an acetate content over 15 percent and preferably over 20 percent by weight of polyvinyl acetate in the polymer is desired. As to the formal content, a weight percent of less than 80 percent of polyvinyl formal content is desired in the polymer.

POLYURETHANE-POLYUREA MODIFIER

The modifying elastomer has a molecular weight of at least 20,000 and preferably in the range of 25–30,000. Useful materials are preferably formed by curing the reaction product of from about 1.5–1.7 mols of an organic diisocyanate with a mixture which comprises from about 0.4 to about 0.6 mol of a hydrocarbon diol having from two to about 10 carbon atoms and having terminal hydroxyl groups, from about 0.03 to about 0.05 mol of a diamino diphenyl sulfone, and 1.0 mol of a polymeric polyester condensation reaction product of 1,4-butane diol and adipic acid having a molecular weight of from about 700 to about 1,500 and an acid number of less than about 10, wherein the isocyanate groups of the diisocyante are equal to from about 92 to about 97 percent of the total reactive hydrogens supplied by the polymeric polyester, the hydrocarbon diol, and the diamine diphenyl sulfone.

Typical useful reactants in preparing the modifying resin are 4,4'-diphenylmethane diisocyante and 4,4'-dicyclo-hexyl-methane diisocyante for the organic diisocyanate. The hydrocarbon diol may be ethylene glycol, 1,4-butane diol, 1,6-hexane diol, 1,5-pentane diol and polyether diols. The diamino diphenyl sulfone may be any of the isomers such as 4,4'-diamino diphenyl sulfone and 3,3'-diamino diphenyl sulfone. Typical commercial examples of these materials will be given in the examples below.

The modifier is suitably combined with the vinyl copolymer to constitute about 5–80 percent by weight of the binder. Specific preferred amounts will be given in the examples below.

OTHER COMPONENTS OF COATING FORMULATION

A magnetically attractive material such as the metal oxide powders will be included. Generally, the magnetically attractive material or pigment will constitute about 65–85 parts by weight of the formulation. Other conventional additives which may be employed as desired include 4–5 parts by weight of reticular carbon particles, about 1.4–2.7 parts by weight of a surfactant or dispersing agent such as lecithin, and about 0.4–1.5 parts by weight of a lubricant such as the conventionally used silicone or mineral oils, fatty acid esters such as butyl laurate or hydrocarbon wax.

GENERAL PROCESS FOR MAGNETIC RECORDING TAPE PRODUCTION

The tape form of a magnetic recording medium is given as a preferred embodiment. One useful sequence of steps for its preparation is as follows:

1. A pigment slurry is formed by high shear mechanical mixing in a suitable container from a mixture comprised of 65–85 parts by weight of a magnetically attractive pigment such as acicular gamma ferric oxide having a spinelle crystalline structure, 4–5 parts by weight of electrically conductive reticular carbon particles, 1.4–2.70 parts by weight of surfactant or dispersing agent, 3.1–11.3 parts by weight copolymer of vinyl chloride-vinyl acetate, at least 5 percent but not more than 80 percent by weight of the binder of a compatible elastomeric polyurethane-polyurea reinforcing modifier, and 150 parts of a ketonic solvent.
2. The slurry is ground in a paint ball mill for 5 to 12 hours until a homogeneous dispersion of magnetically attractive pigment in the aforementioned binder solution is obtained.
3. Into the milled dispersion is mixed 4.7–16.8 parts by weight of additional binder solution which is comprised of a mixture of a high molecular weight vinyl chloride-vinyl acetate copolymer, and at least 5 percent but not exceeding 80 percent by weight of the binder of the thermoplastic polyurethane-polyurea elastomer.
4. 0.4–1.5 parts by weight of a lubricant is added to the milled dispersion containing all of the binder and mixed at high shear for at least 30 minutes.
5. The magnetic coating mixture is then filtered through a microfilter and a magnetic coating disposed onto a plastic substrate such as a polyester or polyvinyl chloride film by means of knife coating, roll coating, dip coating or spray coating. (Other rigid substrates such as aluminum, plastic sheets and paper may be used where a different form of end product is desired.)
6. The magnetic particles are oriented in the wet coating with a magnetizing force of at least 500 oersteds.
7. The wet magnetic coating is cured in a mechanical convection hot air oven to a dry film thickness of approximately 2.5–15.0 microns depending upon end product application.
8. The coating is subjected to a surface finishing treatment such as a polishing and smoothing process.
9. The cured web of magnetic coating is slit into recording tape 0.25–2.00 inches in width.

The following examples of tapes were prepared in accordance with the above steps. Acicular gamma ferric oxide was used as the magnetically attractive pigment.

EXAMPLE I

The high molecular weight vinyl chloride-vinyl acetate copolymer selected is commercially known as Bakelite VYNS vinyl resin and has a glass transition temperature of 79° C. and a reported molecular weight of approximately 35,000. The thermoplastic polyurethane-polyurea elastomer selected has approximately a 30,000 molecular weight and reactive hydroxyl functionality and is commercially available as TPU 123, TPU 546 and TPU 552 from Goodyear Chemical.

These binder components were employed to produce four formulations in the amounts indicated below in parts by weight. The formulations were applied to Mylar film by knife coating and dried in a mechanical convection oven for several minutes at 120°–175° C. All figures represent parts by weight.

| | Formula Number | | | |
|---|---|---|---|---|
| Ingredients | I | II | III | IV |
| Magnetic Powder | 70.0 | 70.0 | 70.0 | 80.0 |
| Reticular Carbon | 4.5 | 4.5 | 4.5 | 4.5 |
| Lecithin | 1.5 | 1.5 | 1.5 | 1.7 |
| VYNS vinyl resin | 21.6 | 11.4 | 18.2 | 12.4 |
| TPU 123 polyurethane-polyurea resin | 1.2 | 11.4 | 4.6 | 0.7 |
| Lubricant | 1.2 | 1.2 | 1.2 | 0.7 |
| Cyclohexanone solvent | 150.0 | 150.0 | 150.0 | 150.0 |

It is known that durability of a coating in general is a manifestation of abrasion resistance while the aging process is a complexity of degradation reaction mechanisms associated with either oxidation, heat or radiation. Therefore, abrasion resistance measurements with the Taber abraser and accelerated aging test results were chosen to demonstrate the improvements provided by this invention.

Test specimens for abrasion measurements consisted of coatings having a cured film thickness of 37.5 microns on a steel plate 11 mils thick and 4 × 4 inches in dimension. The cure condition for coated plates was 3-30 minutes at 100°-150° C. The specimens were abraded for 500 revolutions using two CS 10 grade abrasive wheels each loaded with 1 kilogram weights. The most wear-resistant coatings show the least weight loss in milligrams due to abrasion.

Accelerated aging tests were run by exposing cured magnetic coatings approximately 7 microns in thickness on Mylar film 25 microns in thickness to 200° C. for 30 minutes in a mechanical air convection oven. Subsequently, the coating as well as the substrate was examined qualitatively for evidence of degradation and embrittlement.

Neck down tests were performed on 0.25-inch wide strips of magnetic tape which had been subjected to accelerated aging. This test is a type of elongation test in which the tape is stretched to test the ability of the coatings to be extended and deformed without losing film integrity and adhesion.

Coating formulation number I was compared with a commercial product containing a binder formed from a mixture of a copolymer of vinylidene chloride and acrylonitrile, and a reinforcing modifier of a commercial thermoplastic polyurethane elastomer which is the reaction product of a hydroxy-terminated polyester of 1,4-butane diol and adipic acid, and a diisocyanate such as diphenylmethane 4,4'-diisocyanate. This comparative material will be referred to as a commercial vinyl.

The results of these tests are summarized as follows in Table 1:

TABLE I

|  | Formula I | Commercial Vinyl |
| --- | --- | --- |
| Taber Abrasion | 46.7 mg. | 117.4 mg. |
| Neck Down | Pass | Fail |
| Flexibility | Pass | Fail |
| Effect on Mylar Substrate | None | Embrittlement |
| Adhesion to Mylar Substrate | Pass | Fail |

As shown in Table II, the basic magnetic property measurements of a coating made from formulation Number I compared very favorably with those of a comparable coating made from a premium commercial product designated as a commercial vinyl. In both magnetic coatings the magnetically susceptible pigment was an acicular gamma ferric oxide having a Hc (coercive force) of 260 oersteds, Bm (maximum induction) of 3,500 gauss, and Br (remanent induction) of 2,000 gauss as measured on a 60-cycle hysteresis loop tracer, employing a symmetrical cyclic magnetic field of 1,000 oersteds. The thickness of the magnetic coatings were 300 and 370 microinches respectively.

TABLE II

|  | Formula I | Commercial Vinyl |
| --- | --- | --- |
| Hc (coercive force) oersteds | 290 | 270 |
| Brs (retentivity) gauss | 1,000 | 1,100 |
| φr/φs (residual flux/maximum flux) | 0.76 | 0.76 |

The still frame life of a 1 inch magnetic recording tape made from formulation I of this invention was in excess of 15 minutes indicating a magnetic coating of excellent wear resistance.

Example I makes use of the particular polyurethane-polyurea copolymer commercially known as TPU 123. Other polyurethane-polyurea elastomers differing in molecular weight may be used with equal success. In addition, other vinyl chloride-vinyl acetate copolymers other than the Bakelite VYNS of Example I in which the weight ratio of vinyl chloride/vinyl acetate varies for instance between 97/1 to 90/10 are contemplated. Similarly, good results are obtained when a polyvinyl acetal resin (such as Formvar) is substituted for the vinyl chloride-vinyl acetate copolymer, provided its molecular weight and glass transition temperature (Tg) is of the magnitude given previously. Some of these variations are illustrated in the following examples.

EXAMPLE II

TPU 546 was substituted in formulation II of Example I and resulted in coatings comparable to those containing TPU 123 in the binder. The coating was made from the following ingredients in accordance with the general process scheme described.

| Ingredients | Parts by Weight |
| --- | --- |
| Magnetic Pigment | 70.0 |
| Reticular Carbon | 4.5 |
| Lecithin | 1.5 |
| VYNS Vinyl Resin | 11.4 |
| TPU 546 Polyurethane-Polyurea Resin | 11.4 |
| Lubricant | 1.2 |
| Cyclohexanone Solvent | 150.0 |

EXAMPLE III

Bakelite VYNW resin (molecular weight 40,000) which is a higher molecular weight version of VYNS was used in the following formulation and resulted in satisfactory magnetic coatings which were comparable to those containing the VYNS resin of Example I.

| Ingredients | Parts |
| --- | --- |
| Magnetic Pigment | 70.0 |
| Reticular Carbon | 4.5 |
| Lecithin | 1.5 |
| VYNW Vinyl Resin | 21.6 |
| TPU 123, Polyurethane-Polyurea Resin | 1.2 |
| Lubricant | 1.2 |
| Cyclohexanone Solvent | 150.0 |

The hydroxyl-functionality of the modifier resins used in this invention makes possible a variation obtained by the addition of reactive polyisocyanates to the magnetic dispersion. This causes an in situ chemical modification of the polyurethane-polyurea elastomers. The reaction between reactive —OH and —NCO groups has the effect of increasing the molecular weight of the polyurethane-polyurea elastomers with resulting improvement of physical properties such as higher heat softening and melting points and improvement of adhesion to plastic film substrates such as Mylar without sacrificing other desirable properties of magnetic coatings.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A magnetic recording medium comprising a plastic substrate and a coating thereon including magnetic particles in a binder comprising a copolymer of vinyl chloride and vinyl acetate having a molecular weight above 30,000 and a glass transition temperature above 70° C., 5-80 percent by weight of the binder being a compatible thermoplastic polyurethane-polyurea elastomeric reinforcing modifier having a molecular weight of at least 20,000 and further characterized by the presence of free hydroxyl groups.

2. A magnetic recording medium in accordance with claim 1 wherein said modifier is further characterized as being derived from a diamine sulfone.

3. A magnetic recording medium in accordance with claim 1 wherein said thermoplastic polyurethane-polyurea modifying resin is the cured reaction product of from about 1.5–1.7 mols of an organic diisocyanate with a mixture which comprises from about 0.4 to about 0.6 mol of a hydrocarbon diol having from two to about 10 carbon atoms and having terminal hydroxyl groups, from about 0.03 to about 0.05 mol of a diamine diphenyl sulfone, and 1.0 mol of a polymeric polyester condensation reaction product of 1,4-butane diol and adipic acid having a molecular weight of from about 700 to about 1,500 and an acid number of less than about 10, wherein the isocyanate groups of the diisocyanate are equal to from about 92 to about 97 percent of the total reactive hydrogens supplied by the polymeric polyester, the hydrocarbon diol, and the diamine diphenyl sulfone.

4. A magnetic recording medium in accordance with claim 1 wherein said coating includes about 65–85 parts by weight of said magnetic particles and further includes about 1.4–2.7 parts by weight of a dispersing agent, and about 0.4–1.5 parts by weight of a lubricant.

* * * * *